United States Patent

[11] 3,575,491

[72] Inventor George H. Heilmeier
 Philadelphia, Pa.
[21] Appl. No. 768,145
[22] Filed Oct. 16, 1968
[45] Patented Apr. 20, 1971
[73] Assignee RCA Corporation

[54] DECREASING RESPONSE TIME OF LIQUID CRYSTALS
 5 Claims, 6 Drawing Figs.
[52] U.S. Cl. .................................................. 350/160, 350/267, 350/285
[51] Int. Cl. .................................................. G02f 1/28
[50] Field of Search ......................................... 350/160, 267, 285, (Liq-xral Digest)

[56] References Cited
OTHER REFERENCES

Muller, " Effects of Electric Fields on Cholesterol Nonanoate Liquid Crystals," Molecular Crystals, 1966, Vol. 2 pp. 167— 188.

*Primary Examiner*—Ronald L. Wibert
*Assistant Examiner*—Paul K. Godwin
*Attorney*—H. Christoffersen ABSTRACT: The speed of response of a liquid crystal is increased without degrading the crystal, by applying the crystal an electric field which is of substantially greater value than the minimum value of field required to achieve substantially maximum light scattering from the crystal and, after a short interval, reducing the magnitude of the applied field to a value close to said minimum value.

PATENTED APR 20 1971 3,575,491

INVENTOR
George H. Heilmeier

DECREASING RESPONSE TIME OF LIQUID CRYSTALS

BACKGROUND OF THE INVENTION

Liquid crystals of the type discussed in application Ser. No. 667,857, filed Sept. 14, 1967 for REDUCTION OF TURN-ON DELAY IN LIQUID CRYSTAL CELL by the present inventor and L. A. Zanoni, assigned to the assignee of the present application, have optical properties which make them suitable for use as electrically driven light shutters. However, certain apparatuses require shutters which are very fast—which, for example, response to an electrical signal in a matter of 500 microseconds or less. Operated in the normal way, this type of liquid crystal cannot attain this speed.

It has been discovered that the speed of response of the crystal can be increased very substantially by raising the driving electric field. The limiting value to which the field can be raised is the dielectric breakdown field, which may be of the order of $3\times10^5$ volts per centimeter. Unfortunately, it has been found that when a liquid crystal is operated at a field close to this value for any appreciable length of time, electrochemical reactions occur which degrade the performance of the liquid crystal. In particular, the life of the crystal is very much shortened.

The object of the present invention is to provide a method of operating a liquid crystal so that it exhibits a short response time but not at the expense of long operating life.

BRIEF SUMMARY OF THE INVENTION

According to the invention, an electric field is applied to a liquid crystal of a value substantially in excess of the field required to produce substantially maximum light scattering in the crystal. Then, after a relatively short interval of time, the magnitude of the applied field is decreased to a value close to that required to produce substantially maximum light scattering in the crystal.

DETAILED DESCRIPTION

Figure 1:
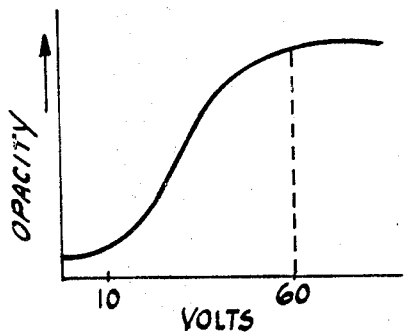
FIG. 1 is a graph showing the opacity exhibited by a liquid crystal as a function of the voltage applied to the crystal.

FIG. 1 illustrates the opacity of a ½-mil thick liquid crystal cell as a function of the voltage applied to the cell. It may be observed that substantially maximum opacity is obtained at about 60 volts and that higher voltages produce no significant increase in opacity. For a ½-mil cell, 60 volts correspond to a field across the liquid crystal of roughly one-fifth of the dielectric breakdown field for the crystal. It is found that in response to the application of such a field, the opacity indicated is not reached for considerably more than 500 microseconds.

In accordance with the present invention, the liquid crystal cell initially is considerably overdriven and then the value of electric field is reduced to one which is close to that required to produce substantial opacity in the cell. The waveform for a ½-mil thick cell may be a direct voltage as shown in solid line in FIG. 2. The initial voltage is 180 volts and this voltage is maintained for a short interval of the order of 10 milliseconds. This voltage corresponds to an electric field which is roughly half of $3\times10^5$ volt centimeters—the dielectric breakdown field. (The voltage can be even higher than this but should not appreciably exceed the breakdown field.) Thereafter, the voltage is reduced to 60 volts. It is found that the application of the high electric field to the crystal for an interval of the order of 10 milliseconds does not appreciably affect the life of the crystal. However, it does, very substantially, reduce the response time from approximately 10 milliseconds to less than 500 microseconds.

The voltage applied to the crystal may be a direct voltage as indicated above. As an alternative, the voltage may be an alternating voltage such as shown by dashed lines in FIG. 2, at a relatively low frequency such as 60 Hz. which has an envelope similar to that of the wave shown in FIG. 2. In one particular circuit where an alternating voltage was applied, a rise time of 500 microseconds was obtained at 25° centigrade with 125 volt RMS, 60 Hz. excitation. The envelope of this alternating voltage corresponded to that shown in FIG. 2. The liquid crystal cell was ½-mil thick and had transparent tin-oxide-coated glass electrodes.

Figure 3:
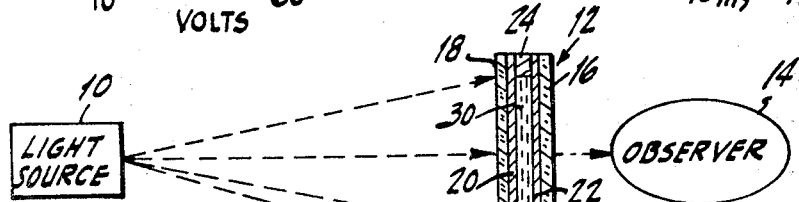
FIG. 3 is a block circuit diagram of a shutter system according to the invention.

A system according to the invention is shown in FIG. 3. It includes a light source 10 and shutter 12. This shutter may, for example, represent a mask covering the eyes of an observer 14. As an alternative, the shutter may, for example, be the windshield of an automobile or of the cockpit of an aircraft.

The shutter 12 includes two sheets of glass 16 and 18 coated on their inner surfaces with transparent conducting layers 20 and 22, which may be formed of a material such as tin-oxide. Glass or other insulating material may be used to provide the end seals 24 and 26 for the shutter. A nematic liquid crystal of the type which exhibits dynamic scattering is located between the two tin-oxide-coated glass plates at 30.

A light sensor 32 such as a photocell and amplifier may be located in front of the shutter. It is connected to the set terminal S of flip-flop 34. The 1 output terminal of the flip-flop is connected to fast turn-on circuit 36 and the latter applies a voltage across the two conductive layers 20, 22.

Figure 2:
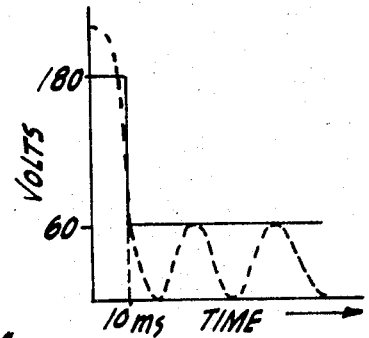
FIG. 2 is a drawing of a waveform which may be applied to the crystal in accordance with the present invention.

In the operation of the system FIG. 3, when the light source 10 produces light at greater than a given value, the light sensor 32 produces an output of sufficient magnitude to set the flip-flop 34. The light source 10, for example, may be the high beam of an approaching automobile or it may be a sudden burst of light due, for example, to a bright flare or bomb or the like. The set flip-flop 34 activates the fast turn-on circuit 36 and the latter applies a wave such as shown in FIG. 2 to the shutter. As already mentioned, this wave may be a direct voltage or it may be an alternating voltage modulated as shown in FIG. 2.

The application of such a voltage causes an electric field to develop across the liquid crystal, which initially has a value close to that of the dielectric breakdown field for the crystal and thereafter reduces to a value close to that which is required for producing maximum opacity at (maximum light scattering from) the crystal. Thus, in response to light of more than a given value from the light source 10, the liquid crystal is changed from a transparent to an opaque state and this change occurs extremely rapidly—in a time of the order of 500 microseconds or less. This is sufficiently fast to prevent any damage to the eyes of the observer 14 or, in cases of light sources of lesser intensity, to prevent momentary blinding of the observer.

The flip-flop 34 may be reset automatically in response to the dropping to less than a predetermined value of the electric signal produced by the light sensor 32. Or, as an alternative, the flip-flop may be manually reset by means of the switch 40 which is shown to be in series between the battery 42 and the reset terminal R of the flip-flop. As another alternative, the light sensor 32, which may include a photocell or the like (plus appropriate biasing or activating supply) and an amplifier, may be directly connected to the fast turn-on circuit of FIG. 6. In this case, the liquid crystal will change back from its opaque to its transparent condition automatically.

Figure 4:
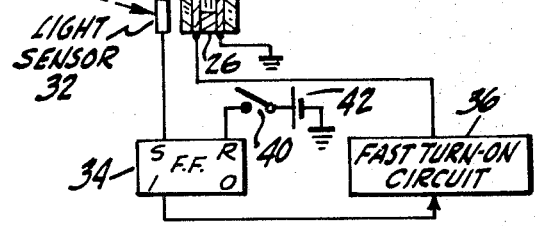
FIGS. 4, 5 and 6 are schematic circuit diagrams of different forms of fast turn-on circuits which may be employed in the system of FIG. 3.
Figure 5:
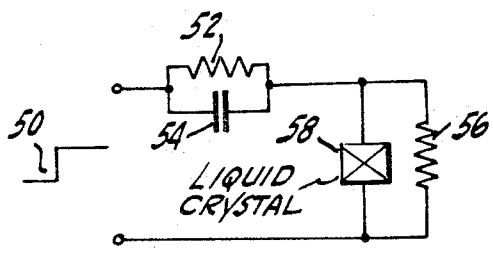
Figure 5:
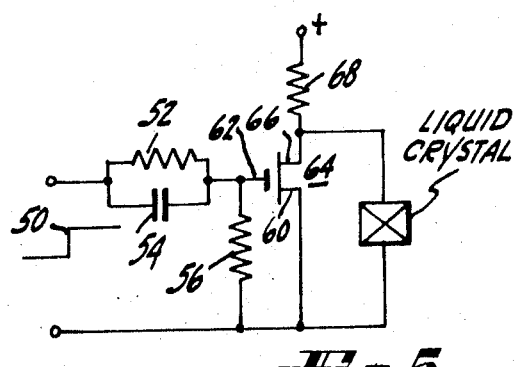

The circuit for producing the waveform shown in FIG. 2 may take one of many different forms. Two typical circuits are shown in FIGS. 4 and 5. In FIG. 4, the sudden change in direct-current level shown at 50, which may be produced, for example, when the flip-flop 34 is set, is applied to the differentiator consisting of resistor 52 and capacitor 54. With proper choice of circuit elements and of the resistor 56 which is in shunt with the liquid crystal cell 58 (corresponding to the shutter 12 of FIG. 3), the circuit will produce the waveform shown in somewhat idealized fashion in solid line in FIG. 2.

The modified version of the circuit of FIG. 4 shown in FIG. 5 includes the differentiator 52, 54 and the resistor 56. However, the latter is connected between the source 60 and gate 62 electrodes of field-effect transistor 64. The liquid crystal cell, that is, the shutter 12 of FIG. 3, is connected between the source 60 and drain 66 electrodes of the transistor. The operating voltage indicated by the plus sign is applied through resistor 68 to the drain electrode 66. As in the case of the FIG. 4 circuit, with proper choice of circuit parameters, the waveform of FIG. 2 is produced.

Figure 6:
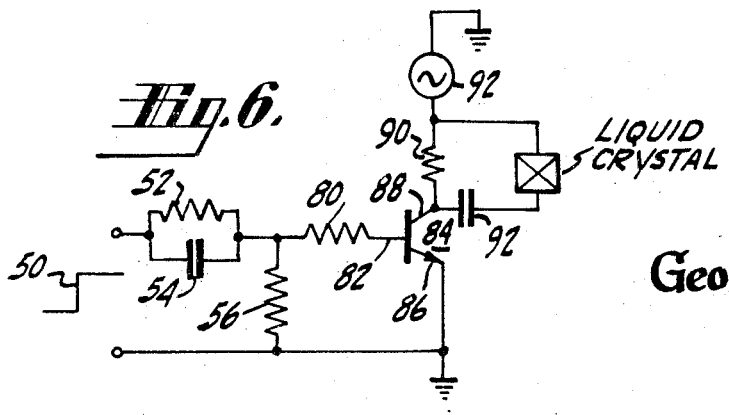

The circuit of FIG. 6 may be employed for producing an alternating voltage which is modulated in the manner shown generally in FIG. 2. However, rather than employing a frequency of 60 Hz., a somewhat higher frequency of 200-–300 Hz. is used so that several cycles of the alternating voltage will occur during the initial 10 millisecond interval.

The circuit of FIG. 6 includes the circuit elements 52, 54 and 56 of FIG. 5. This differentiator is coupled through resistor 80 to the base 82 of NPN transistor 84. The emitter 86 of the transistor is connected to ground and the collector 88 of the transistor is connected through load resistor 90 to alternating voltage source 92. The liquid crystal cell analogous to 12 of FIG. 3 in series with capacitor 92 are connected across the load resistor 90.

In the operation of the circuit of FIG. 6, in response to the signal 50 indicative of a light flash, the differentiator 52, 54, 56 applies a wave such as shown in solid line in FIG. 2 (but at lower voltage values) to the base 82 of transistor 84. This turns the transistor on and for the first 10 milliseconds it conducts relatively heavily during each positive-going portion of the sine wave produced by source 92. As a result of this operation, the alternating voltage developed across resistor 90 is placed across the series circuit of the liquid crystal cell and capacitor 92. This voltage causes the liquid crystal cell rapidly to turn on in the manner already described. After a relatively short interval, such as 10 milliseconds, the voltage applied to the base 82 reduces to a lower value as does the alternating voltage applied across the liquid crystal cell.

If it is desired to produce an alternating voltage at a lower frequency it is important that the proper phase of the alternating voltage be selected during the first 10 milliseconds of the alternating voltage as is clear from FIG. 2. To achieve this type of operation, a special type of oscillator as, for example, in McCurdy, Pat. No. 2,991,469 should be employed and should be triggered on by the input signal 50. This oscillator starts at the same place each cycle when it is turned on. The cosine wave $e_3$ such as shown in FIG. 5 may be selected.

One further point worth mentioning is the difference between the circuit of the present application and the circuit of the copending application referred to above. In the latter, a bias lower than the dynamic scattering threshold for the liquid crystal is applied to the crystal. This bias serves to decrease the turn-on delay, that is, it serves to decrease the time required between the application of the turn-on pulse and the time that dynamic scattering starts. In the system of the present application, the signal applied to the liquid crystal initially has a value substantially greater than that required to fully turn-on the crystal. In terms of FIG. 1, this voltage is not only greater than the threshold voltage for dynamic scattering, shown to be about 10 volts, but is also greater than the voltage at which substantially maximum opacity is achieved, shown to be 60 volts. The purpose of this voltage is to reduce the time between the leading edge of the turn-on pulse and the time at which maximum opacity (maximum light scattering) is achieved.

I claim:

1. A method for increasing the speed of response of a liquid crystal cell comprising the steps of:
   applying across the cell an electric field of a value substantially greater than that of the minimum field required to produce substantially maximum light scattering in the crystal; and
   after a relatively short interval of time, decreasing the magnitude of the applied field to a value close to that at which the crystal begins to exhibit substantially maximum light scattering.

2. In the method set forth in claim 1, said electric field having an initial value close to that of the dielectric breakdown filed for the liquid crystal cell.

3. In the method set forth in claim 1, said relatively short interval of time being of the order of a hundredth of a second.

4. A method for increasing the speed of response of a liquid crystal cell comprising the steps of:
   applying across the cell an electric field at least double that of the field required to produce substantially maximum light scattering in the crystal; and
   after an interval of time less than that which will permit substantial degradation of the liquid crystal to occur, decreasing the magnitude of the applied field to a value close to that at which the crystal begins to exhibit substantially maximum light scattering.

5. In combination:
   a light shutter comprising two transparent insulating layers, a nematic liquid crystal located between said layers and two transparent conductor layers, one on the inner surface of each insulating layer, adjacent to the liquid crystal;
   light-sensing means located adjacent to said shutter for producing an electrical signal in response to light of greater than a given magnitude;
   circuit means which, in response to said signal, produces an output voltage having an initial value which is substantially greater than a minimum value required to produce substantially maximum light scattering in said liquid crystal, and which within a fraction of a second reduces to a value equal to or slightly greater than said minimum value;
   means for applying said signal to said circuit means; and
   means for applying said output voltage across said two transparent conductors.